S. Boyden.
Forming Bats.
No. 25300.    Patented Aug. 30. 1859.
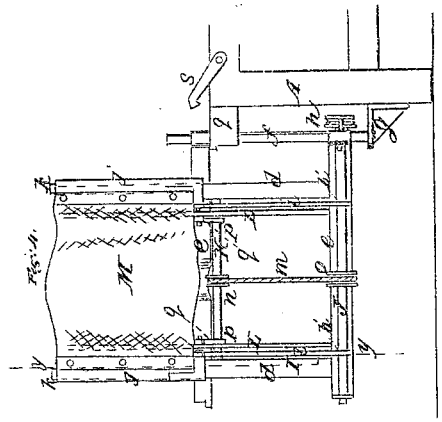
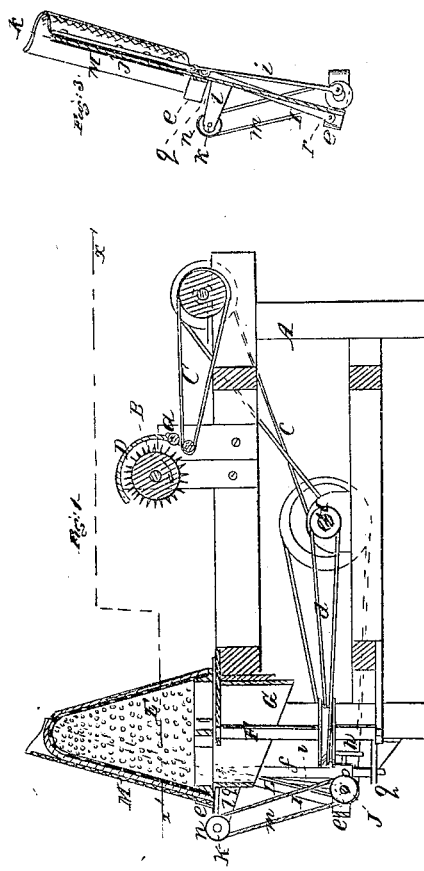
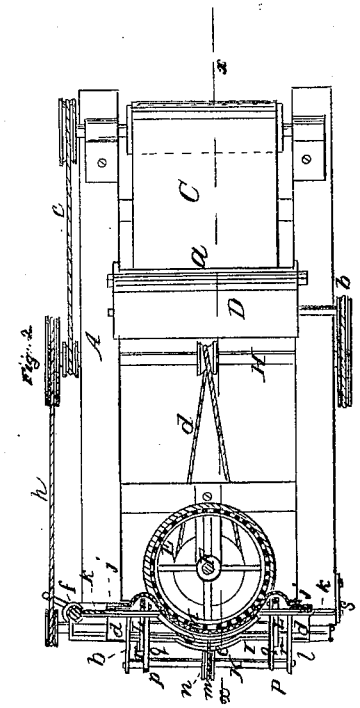
Witnesses:    Philip Brileur
J. W. Coombs.
Inventor:
Seth Boyden

UNITED STATES PATENT OFFICE.

SETH BOYDEN, OF NEWARK, NEW JERSEY, ASSIGNOR TO HIMSELF AND H. H. JACQUES, OF SAME PLACE.

MACHINERY FOR HARDENING HAT-BODIES.

Specification of Letters Patent No. 25,300, dated August 30, 1859.

*To all whom it may concern:*

Be it known that I, SETH BOYDEN, of Newark, in the county of Essex and State of New Jersey, have invented a new and useful Machine for Manufacturing Hat-Bodies; and I do hereby declare that the following is a full, clear, and exact description of the same, reference being had to the annexed drawings, making a part of this specification, in which—

Figure 1, is a side sectional view of my invention taken in the line $x$, $x$, Fig. 2. Fig. 2, is a horizontal section of ditto, taken in the line $x'$, $x'$, Fig. 1. Fig. 3, is a side sectional view of a portion of ditto taken in the line $y$, $y$, Fig. 4. Fig. 4, is a face view of the portion shown in Fig. 3.

Similar letters of reference indicate corresponding parts in the several figures.

To enable those skilled in the art to fully understand and construct my invention I will proceed to describe it.

A, represents a rectangular frame which may be constructed in any proper way to support the working parts of the machine.

B, is a picker cylinder on the frame A, directly in front of an endless feed apron C, and $a$, is a pressure roller at the inner end of apron C.

D, is a curb or guard which extends over the picker cylinder. The above parts are shown in Figs. 1 and 2, and being old and well known for the purpose here used, a more minute description is not deemed necessary.

E, is a perforated cone or former attached to the upper part of a vertical shaft F, and over a suction blast spout G. This cone or former is constructed and arranged relatively with the spout G, in the usual way.

In the frame A, a driving shaft H, is placed from one end of which the picker-cylinder B, is driven by a belt $b$. The apron C, is driven from the opposite end of said shaft by a belt $c$, and the perforated cone or former E, is driven from said shaft H, by a belt $d$.

On the end of the frame A, where the former E, is placed a frame I, is hung at one end so as to open and close or fit snugly to the end of the frame like a gate. This frame is of quite simple construction being formed of two uprights or slightly inclined bars $d$, $d$, connected at their upper and lower ends by traverse bars $e$, $e$, which are attached at one end to a shaft or arbor $f$, fitted in bearings $g$, on the frame A, the arbor $f$, and bearings forming the joint or hinge on which the frame I, swings.

In the lower part of the frame I, a shaft J, is placed, and is rotated from the driving shaft H, by a belt $h$. On the shaft J, there are two small eccentrics $h'$, $h'$, to each of which a connecting rod or pitman $i$, is attached, and the upper ends of these connecting rods or pitmen are attached to tubes $j$, $j$, one to each, said tubes being fitted and allowed to slide freely on extensions $k$, of the bars $d$, $d$, of the frame I,—the extensions $k$, being narrower and thinner than the bars $d$.

To the upper part of the frame I, two arms $l$, $l$, are attached in the outer parts of which a shaft K, is fitted. The shaft K, is rotated from the shaft J, by a belt $m$, the shaft K, having a quicker motion in consequence of the pulley $n$, on shaft K, being smaller than the pulley $o$, on shaft J. On the shaft K, there are two small eccentrics $p$, $p$, to which connecting rods $q$, are attached, one to each. These rods $q$, are attached to bars L, the lower ends of which are connected by joints $r$, $r$, to the lower traverse bar $e$, of the frame I. The bars L, L, extend up back or at the outer side of a cloth M, the edges of which are attached to the tubes $j$, $j$. The eccentrics $p$, $p$, have opposite positions on the shaft K.

The frame I, has an inclination corresponding with that of the periphery of the former E, so that the cloth M, will be parallel with the surface of the cone as shown clearly in Fig. 1. On the end of the frame A, near the frame I, a hook $s$, is attached for the purpose of retaining the frame I, close to the frame A.

The operation is as follows: The fur is placed by hand on the apron C, which carries it to the picker cylinder B, the latter by its rotation in the direction indicated by the arrow takes it from the end of the apron and throws it in front to be conveyed by a blast or other suitable means on the cone or former E, the suction blast within said cone or former causing the fibers of fur to advance to the cone. While this process is in progress the cloth M, is pressed against the fur on the cone by the atmosphere a result due to the suction within the cone and the cloth M, is moved up and down by the eccentrics and pitman on shaft J, and at the same time has a lateral motion given it by the pitman $q$, of shaft K, said pitman $q$, working in opposite directions and rather more rapidly than the pitmen $i$. This unequal movement of the pitmen insures the working of the cloth M, in such a way as to effectually felt or harden the fur as it is thrown on the cone or former, the cloth having what may be termed a compound movement which greatly augments its rubbing action. The operation of the cloth M, is not extended beyond the forming process, that is to say, as soon as all the fur necessary to form a hat body has been distributed on the cone or former E, the whole work of forming and hardening is completed, so rapidly does the cloth M, perform its work. When the hat body is formed the frame I, is swung out from the frame A, and the cone or former E, is rendered perfectly accessible so that the finished body may be readily removed, the frame I, again closed and the operation repeated.

By this invention a vast deal of labor is saved in the manufacture of hat bodies as hitherto the bodies have been formed at one operation, that is to say, the fibers loosely put together on a perforated cone or former and then by a separate and distinct operation hardened for the hatter's use.

I do not claim the rotating perforated cone or former with a suction blast within, nor do I claim the picker-cylinder with endless feed apron, for such devices are in common use and well known, when combined as herein shown, as a machine for forming hat bodies.

I claim therefore as new and desire to secure by Letters Patent,

1. The employment of a cloth M, or its equivalent, in combination with a cone E, in the manner and for the purpose substantially as herein shown and described.

2. The arrangement and combination of the frame I, shaft J, eccentrics ($h'$), rods ($i$), tubes ($j$) arms ($l$), shaft K, eccentrics ($p$) rods ($q$) bars L, and cloth M, substantially as herein shown and described, so that the cloth M will be operated with a compound movement as set forth.

SETH BOYDEN.

Witnesses:
PHILIP BOILEAU JONES,
J. W. COOMBS.